US011438045B2

(12) United States Patent
Park et al.

(10) Patent No.: US 11,438,045 B2
(45) Date of Patent: *Sep. 6, 2022

(54) METHOD FOR REPORTING CHANNEL STATE INFORMATION BY TERMINAL IN WIRELESS COMMUNICATION SYSTEM AND DEVICE FOR SUPPORTING SAME

(71) Applicant: LG ELECTRONICS INC., Seoul (KR)

(72) Inventors: Hanjun Park, Seoul (KR); Kijun Kim, Seoul (KR); Eunsun Kim, Seoul (KR); Jiwon Kang, Seoul (KR); Kunil Yum, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,793

(22) Filed: Jan. 5, 2021

(65) Prior Publication Data
US 2021/0126689 A1   Apr. 29, 2021

Related U.S. Application Data

(63) Continuation of application No. 16/321,374, filed as application No. PCT/KR2017/008149 on Jul. 28, 2017, now Pat. No. 10,917,153.

(Continued)

(51) Int. Cl.
*H04L 5/00* (2006.01)
*H04B 7/06* (2006.01)
(Continued)

(52) U.S. Cl.
CPC ............ *H04B 7/0626* (2013.01); *H04B 7/06* (2013.01); *H04B 7/0617* (2013.01); *H04B 17/24* (2015.01);
(Continued)

(58) Field of Classification Search
CPC ........ H04B 17/24; H04B 7/06; H04B 7/0617; H04B 7/0626; H04L 27/2607; H04L 5/0007; H04L 5/0048; H04W 56/001
(Continued)

(56) References Cited

U.S. PATENT DOCUMENTS

2013/0163544 A1   6/2013 Lee et al.
2014/0078990 A1*  3/2014 Lee .................. H04L 1/0029
                                              370/329
(Continued)

FOREIGN PATENT DOCUMENTS

CN   103812546 A   5/2014
CN   104041131 A   9/2014
(Continued)

OTHER PUBLICATIONS

R1-156718, XP051003100: 3GPP TSG RAN WG1 Meeting #83, Anaheim, US Nov. 15-22, 2015, "CSI Reporting for Class B FD-MIMO Schemes," Alcatel-Lucent, Alcatel-Lucent Shanghai Bell, (5 pages).
(Continued)

*Primary Examiner* — Robert J Lopata
(74) *Attorney, Agent, or Firm* — Dentons US LLP

(57) ABSTRACT

Disclosed are a method for reporting channel state information by a terminal and, a device for supporting the same. More particularly, disclosed are a method in which a base station transmits a signal using a plurality of analog beams, and a terminal calculates channel state information feedback and reports the channel state information to the base station, in response to the base station, and a device for supporting the same.

7 Claims, 12 Drawing Sheets

Related U.S. Application Data

(60) Provisional application No. 62/368,170, filed on Jul. 29, 2016.

(51) Int. Cl.
*H04B 17/24* (2015.01)
*H04L 27/26* (2006.01)
*H04W 56/00* (2009.01)

(52) U.S. Cl.
CPC ........ *H04L 5/0048* (2013.01); *H04L 27/2607* (2013.01); *H04W 56/001* (2013.01); *H04L 5/0007* (2013.01)

(58) Field of Classification Search
USPC ........................................................ 370/329
See application file for complete search history.

(56) References Cited

U.S. PATENT DOCUMENTS

| | | | |
|---|---|---|---|
| 2014/0286182 A1 | 9/2014 | Chen et al. | |
| 2015/0207604 A1* | 7/2015 | Sun | H04B 7/0626 370/329 |
| 2015/0264694 A1* | 9/2015 | Nagata | H04W 28/16 370/329 |
| 2015/0289281 A1* | 10/2015 | Kim | H04W 72/085 375/267 |
| 2016/0105817 A1 | 4/2016 | Frenne et al. | |
| 2016/0226640 A1* | 8/2016 | Seol | H04B 7/0695 |
| 2016/0277954 A1* | 9/2016 | Frenne | H04W 24/10 |
| 2016/0323029 A1* | 11/2016 | Cheng | H04B 7/0617 |
| 2017/0141859 A1* | 5/2017 | Seo | H04B 17/345 |
| 2017/0181132 A1* | 6/2017 | Xiao | H04B 7/0413 |
| 2017/0353227 A1* | 12/2017 | Liu | H04L 27/2613 |
| 2017/0366377 A1* | 12/2017 | Papasakellariou | H04L 5/0057 |
| 2018/0027549 A1* | 1/2018 | Wang | H04L 5/0055 370/329 |
| 2018/0368142 A1* | 12/2018 | Liou | H04W 16/14 |
| 2019/0306847 A1* | 10/2019 | Seo | H04B 7/0417 |

FOREIGN PATENT DOCUMENTS

| | | |
|---|---|---|
| CN | 104205700 A | 12/2014 |
| CN | 104350689 A | 2/2015 |
| KR | 1020120029338 A | 3/2012 |
| KR | 10-2014-0121391 A | 10/2014 |
| KR | 1020150060916 A | 6/2015 |
| KR | 10-2016-0013250 A | 2/2016 |
| KR | 10-2016-0015821 A | 2/2016 |

OTHER PUBLICATIONS

XP055679961: Overview of Full-Dimension MIMO in LTE-Advanced Pro, Ji et al., May 6, 2016, (20 pages).
R1-152854, XP050971112: 3GPP TSG RAN WG1 #81, Fukuoka, Japan, May 25-29, 2015; Samsung, "Discussion on priority rules for CSI feedback for eCA," (3 pages).
R1-156852, XP051003208: 3GPP TSG RAN WG1 Meeting #83, Anaheim, USA Nov. 16-20, 2015, LG Electronics, "Aperiodic CSI enhancement for Rel-13 CA," (3 pages).
R1-155505, XP051039671:3GPP TSG RAN WG1 Meeting #82bis, Malmo, Sweden, Oct. 5-9, 2015, Samsung, "BI and PMI reporting for class B," (5 pages).
3GPP TR 36.897 V13.0.0, "Study on elevation beamforming / Full-Dimension (FD) Multiple Input Multiple Output (MIMO) for LTE (Release 13)", Jul. 3, 2015, p. 17.
Samsung, "Clarifications on non-PMI based CSI reporting", 3GPP TSG RAN WG1 Meeting #84, Feb. 15-19, 2016, R1-160529.

* cited by examiner

METHOD FOR REPORTING CHANNEL STATE INFORMATION BY TERMINAL IN WIRELESS COMMUNICATION SYSTEM AND DEVICE FOR SUPPORTING SAME

This application is a continuation application of U.S. patent application Ser. No. 16/321,374, filed on Jan. 28, 2019, which is the National Stage filing under 35 U.S.C. 371 of International Application No. PCT/KR2017/008149, filed on Jul. 28, 2017, which claims priority to U.S. Provisional Application No. 62/368,170, filed on Jul. 29, 2016, the contents of which are all hereby incorporated by reference herein in their entirety.

TECHNICAL FIELD

The present disclosure relates to a wireless communication system, and more particularly to, a method of reporting channel state information to a base station by a terminal in a wireless communication system and device for supporting the same.

More specifically, the present disclosure includes a method in which when a base station transmits signals using multiple analog beams, a terminal calculates channel state information feedback and reports the channel state information feedback to the base station and device for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE OF THE INVENTION

Technical Task

The object of the present disclosure is to provide a method of reporting channel state information by a terminal in a newly proposed communication system.

In particular, the object of the present disclosure is to provide a method in which when a base station transmits signals using multiple analog beams, the base station configures, for a terminal, Channel State Information (CSI) resources for the multiple analog beams and a method in which the terminal reports CSI.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method for transmitting and receiving channel state information between a base station and a terminal and devices therefor. In particular, the present disclosure provides a method in which when a base station transmits signals using multiple analog beams, a terminal reports channel state information by considering the multiple analog beams managed by the base station and devices therefor.

In an aspect of the present disclosure, provided is a method of reporting Channel State Information (CSI) by a terminal in a wireless communication system including a base station transmitting signals using multiple analog beams. The method may include: receiving, by the terminal, information indicating at least one CSI resource for reporting the CSI from the base station, wherein the information indicating the at least one CSI resource may include at least one piece of CSI resource configuration information and information on one or more analog beams, each of which corresponds to each piece of CSI resource configuration information; and calculating CSI feedback for the at least one CSI resource and transmitting the calculated CSI feedback to the base station.

In another aspect of the present disclosure, provided is a terminal for reporting Channel State Information (CSI) in a wireless communication system including a base station transmitting signals using multiple analog beams. The terminal may include: a transmitter; a receiver; and a processor connected to the transmitter and the receiver. In this case, the processor may be configured to: receive information indicating at least one CSI resource for reporting the CSI from the base station, wherein the information indicating the at least one CSI resource may include at least one piece of CSI resource configuration information and information on one or more analog beams, each of which corresponds to each piece of CSI resource configuration information; and calculate CSI feedback for the at least one CSI resource and transmit the calculated CSI feedback to the base station.

The terminal may receive information on a plurality of CSI resource configurations from the base station through Radio Resource Control (RRC) signaling. In this case, the information on the one or more analog beams may include antenna port information corresponding to at least one CSI resource configuration among the plurality of CSI resource configurations, and the information indicating the at least one CSI resource for reporting the CSI may be transmitted through physical layer or Medium Access Control (MAC) layer signaling.

Alternatively, the terminal may receive information on a CSI resource configuration having quasi co-locate (QCL) relationship with each serving beam index from the base station through Radio Resource Control (RRC) signaling. In this case, the information on the one or more analog beams may include information indicating an index of at least one serving beam used by the base station for signal transmission, and the information indicating the at least one CSI resource for reporting the CSI may be transmitted through physical layer or Medium Access Control (MAC) layer signaling.

Alternatively, the at least one piece of CSI resource configuration information may include information on an antenna port having Quasi Co-Location (QCL) relationship with each CSI resource configuration, and the information on the one or more analog beams may include information indicating a sweeping index including the one or more analog beams in a sweeping index set applied to the at least one CSI resource.

Here, the terminal may receive information on the sweeping index set applied to the at least one CSI resource from the base station.

In addition, the information on the sweeping index set may include information on a corresponding sweeping index set per at least one symbol.

Alternatively, the terminal may receive information on a plurality of Zero Power (ZP) Channel State Information-Reference Signal (CSI-RS) configurations from the base station. In this case, the information indicating the at least one CSI resource may further include information indicating at least one ZP CSI-RS configuration among the plurality of ZP CSI-RS configurations, and the CSI feedback may be calculated by additionally considering the at least one ZP CSI-RS configuration.

Alternatively, the CSI feedback may include information on a CSI resource preferred by the terminal among the at least one CSI resource.

Here, the information on the CSI resource preferred by the terminal may include a CSI resource configuration index corresponding to the CSI resource preferred by the terminal and a sweeping index including an analog beam preferred by the terminal among one or more analog beams corresponding to the preferred CSI resource. Alternatively, the information on the CSI resource preferred by the terminal may include index information of an analog beam preferred by the terminal among one or more analog beams corresponding to the CSI resource preferred by the terminal.

Alternatively, when transmitting the CSI feedback, the terminal may transmit, to the base station, information on at least one analog beam with a good reception sensitivity in terms of reception at the terminal.

Alternatively, when transmitting the CSI feedback, the terminal may transmit a signal requesting Beam State Information (BSI) reporting to the base station.

In the present disclosure, calculating, by the terminal, the CSI feedback may include: when the number of the at least one CSI resource indicated by the base station exceeds maximum CSI calculation capability of the terminal, selecting at least one CSI resource for calculating the CSI feedback from among the at least one CSI resource indicated by the base station according to a predetermined criterion; and calculating the CSI feedback only for the selected at least one CSI resource.

In this case, the predetermined criterion may include an order of serving beam indices corresponding to the at least one CSI resource or an order of CSI resources corresponding to analog beams with good reception sensitivities in terms of reception at the UE.

According to the present disclosure, the CSI resource configuration information may include information on Channel State Information-Reference Signal (CSI-RS) and Channel State Information-Interference Measurement (CSI-IM) resources.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present disclosure, a terminal can efficiently transmit CSI required by a base station performing signal transmission using multiple analog beams to the base station in a newly proposed wireless communication system.

In particular, according to the present disclosure, it is possible to minimize signaling overhead that occurs when a base station reconfigures a CSI resource configuration due to frequent change of a serving beam.

The effects that can be achieved through the embodiments of the present disclosure are not limited to what has been particularly described hereinabove and other effects which are not described herein can be derived by those skilled in the art from the following detailed description. That is, it should be noted that the effects which are not intended by the present disclosure can be derived by those skilled in the art from the embodiments of the present disclosure.

DESCRIPTION OF DRAWINGS

The accompanying drawings, which are included to provide a further understanding of the invention, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

MODE FOR CARRYING OUT THE INVENTION

Figure 1:
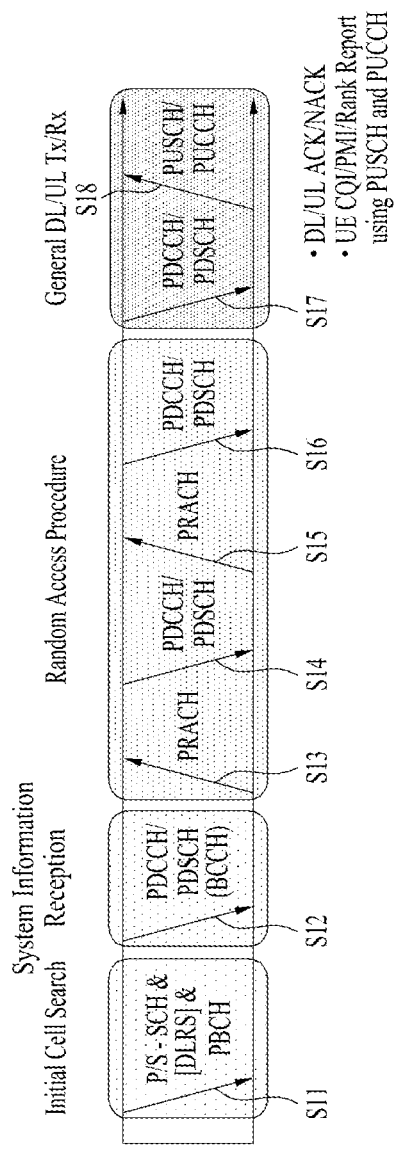
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service, and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1 Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2 Resource Structure

Figure 2:
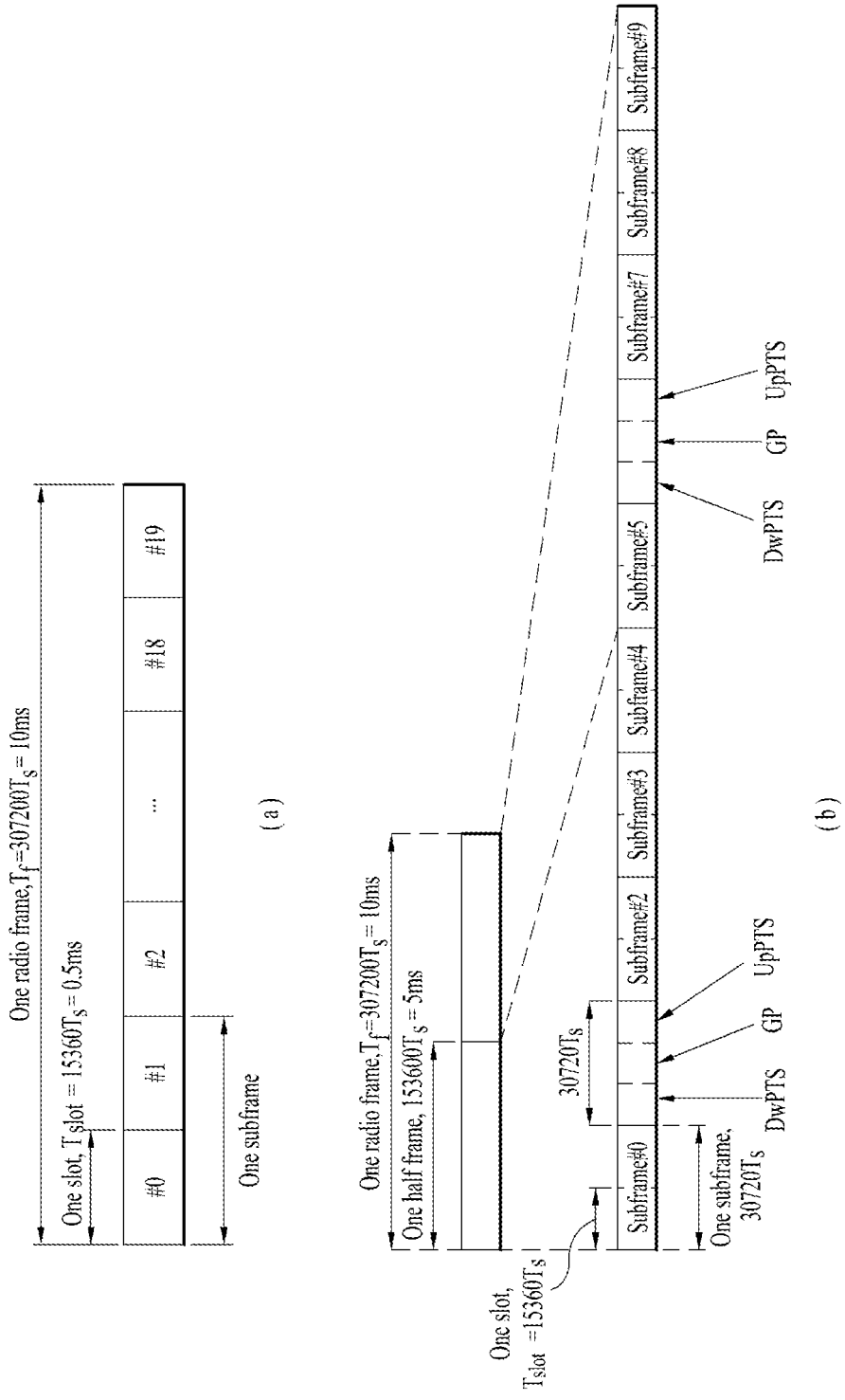
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 3:
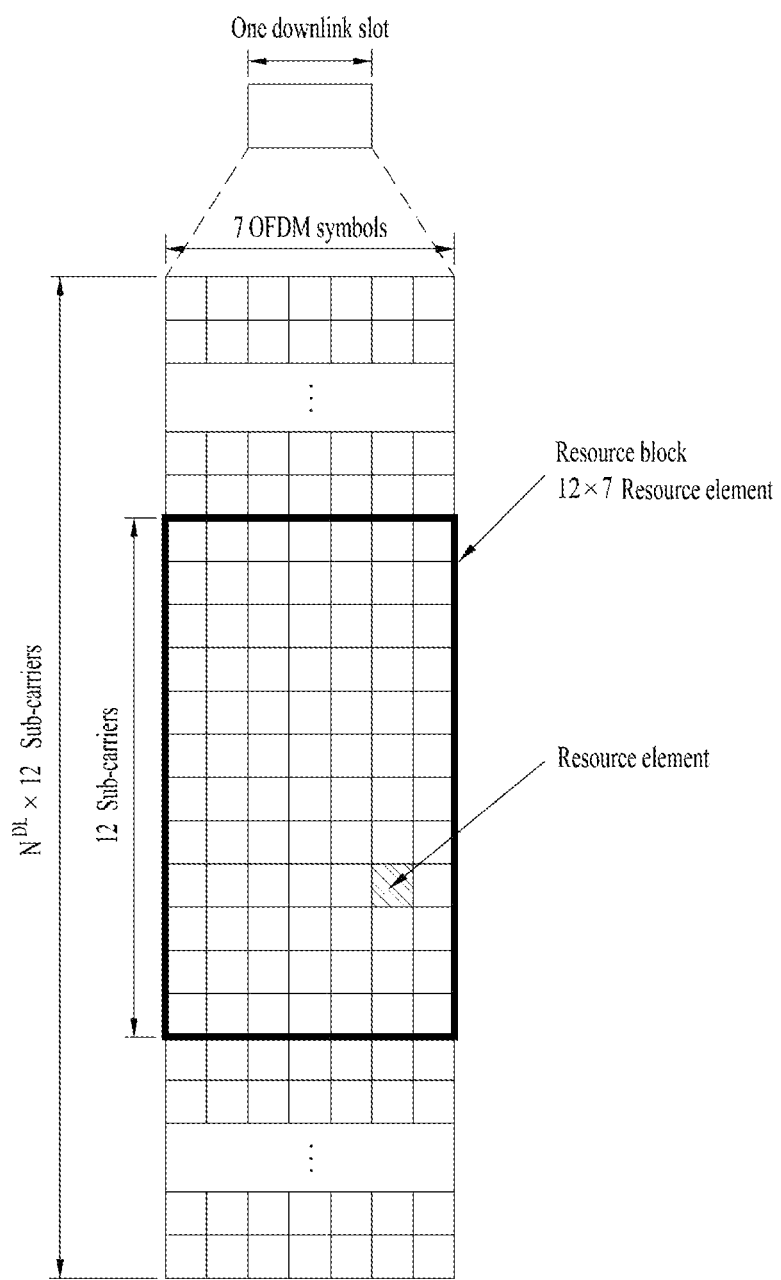
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
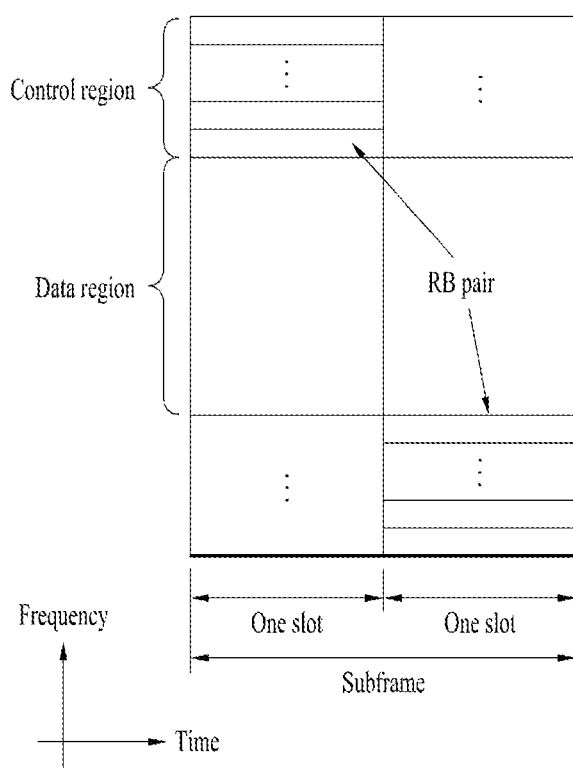
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus, it is said that the RB pair frequency-hops over a slot boundary.

Figure 5:
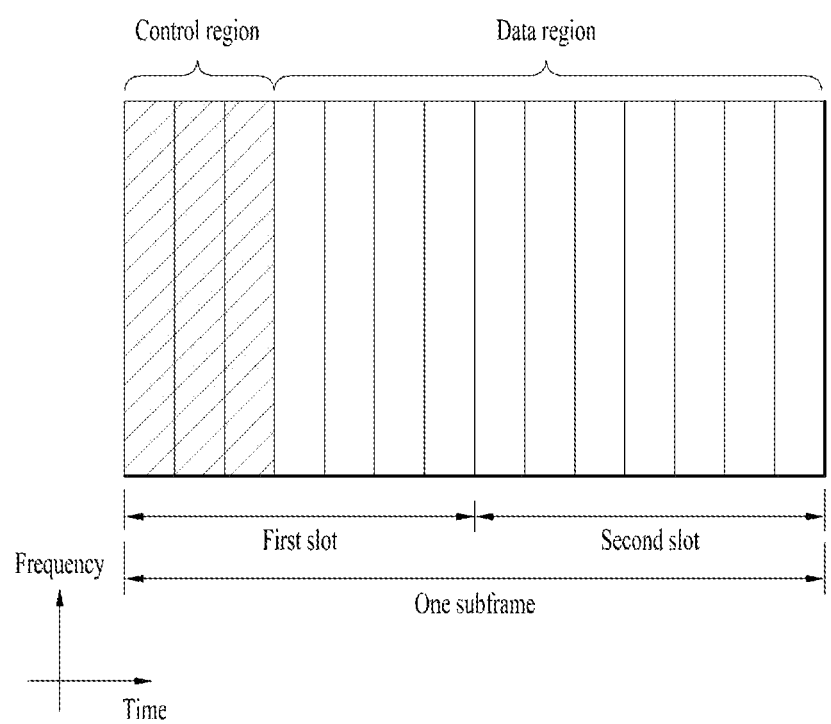
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE and receive a report of the CSI for each process from the UE. Here, the CSI process is configured with a CSI-RS for specifying signal quality from the base station and a CSI-interference measurement (CSI-IM) resource for interference measurement.

In LTE Release 11, a serving cell that provides data allocates a target UE a Channel State Information-Reference Signal (CSI-RS), which is a reference signal for measuring a data channel, and Channel State Information-Interference Measurement (CSI-IM), which is a resource for measuring interference, to enable the UE to perform CSI feedback. In the LTE system, a combination of the CSI-RS and CSI-IM is defined as a CSI process.

Generally, a BS configures a CSI process for a UE through a higher layer signal such as RRC signaling, and upon receiving the CSI process, the UE measures spatial characteristics and channel gain of a reception channel from a CSI-RS and measures spatial characteristics and interference intensity of an interference signal from CSI-IM. Thereafter, the UE reports CSI for the corresponding CSI process using a Rank Indicator (RI), a Precoding Matrix Indicator (PMI), and/or a Channel Quality Indicator (CQI) to a serving cell.

The RI indicates channel rank information and means the number of spatial layers a UE can receive on the same time-frequency resource. The RI represents average characteristics of a channel, and thus it may have a reporting periodicity longer than that of the PMI or CQI. Meanwhile, the PMI and CQI mean a precoding index preferred by a UE in terms of a reception SINR and an SINR expected when the corresponding precoding is applied, respectively. In addition, in LTE-Release 11, multiple CSI processes can be allocated a UE so that the UE can receive data from at least one cell according to a coordinated multiple point transmission/reception (CoMP) technique. In this case, the UE measures CSI using CSI-RS and CSI-IM resources in each CSI process and provide feedback to a BS according to independent periodicities and subframe offsets.

1.4. RRM Measurement

The LTE system supports Radio Resource Management (RRM) operation including power control, scheduling, cell search, cell reselection, handover, radio link or connection monitoring, and connection establishment/re-establishment. In this case, a serving cell may request a UE to send RRM measurement information, which contains measurement values for performing the RRM operation. As a representative example, in the LTE system, the UE may measure cell search information, Reference Signal Received Power (RSRP), Reference Signal Received Quality (RSRQ), etc. for each cell and then report the measured information. Specifically, in the LTE system, the UE receives 'measConfig' for the RRM measurement from the serving cell through a higher layer signal and then measure RSRP or RSRQ according to information in 'measConfig'.

In the LTE system, the RSRP, RSRQ, and RSSI has been defined as follows.

The RSRP is defined as the linear average over the power contributions (in [W]) of the resource elements that carry cell-specific reference signals within the considered measurement frequency bandwidth. For example, for RSRP determination, the cell-specific reference signals $R_0$ shall be used. For RSRP determination, the cell-specific reference signals $R_0$ shall be used. If the UE can reliably detect that $R_1$ is available, it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

The RSRQ is defined as the ratio NxRSRP/(E-UTRA carrier RSSI), where N is the number of RBs of the E-UTRA carrier RSSI measurement bandwidth. The measurements in the numerator and denominator shall be made over the same set of resource blocks.

The E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

The RSSI is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

Based on the above-described definitions, in the case of intra-frequency measurement, a UE operating in the LTE system may measure the RSRP in a bandwidth indicated by an allowed measurement bandwidth related information element (IE) transmitted in system information block type 3 (SIB3). Meanwhile, in the case of inter-frequency measurement, the UE may measure the RSRP in a bandwidth corresponding to one of 6, 15, 25, 50, 75, 100 resource blocks (RBs) indicated by an allowed measurement bandwidth related IE transmitted in SIB5. Alternatively, if there is no IE, the UE may measure the RSRP in the entire downlink (DL) system frequency bandwidth as the default operation.

Upon receiving information on the allowed measurement bandwidth, the UE may regard the corresponding value as the maximum measurement bandwidth and then freely measure the RSRP value within the corresponding value. However, if the serving cell transmits an IE defined as WB-RSRQ to the UE and sets the allowed measurement bandwidth to be equal to or greater than 50 RBs, the UE should calculate the RSRP value for the entire allowed measurement bandwidth. Meanwhile, when intending to the RSSI, the UE measures the RSSI using a frequency band of the UE's receiver according to the definition of RSSI bandwidth.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present disclosure, for simplicity, this technology will be referred to as New RAT or NR (New Radio).

2.1. Self-Contained Subframe Structure

Figure 6:
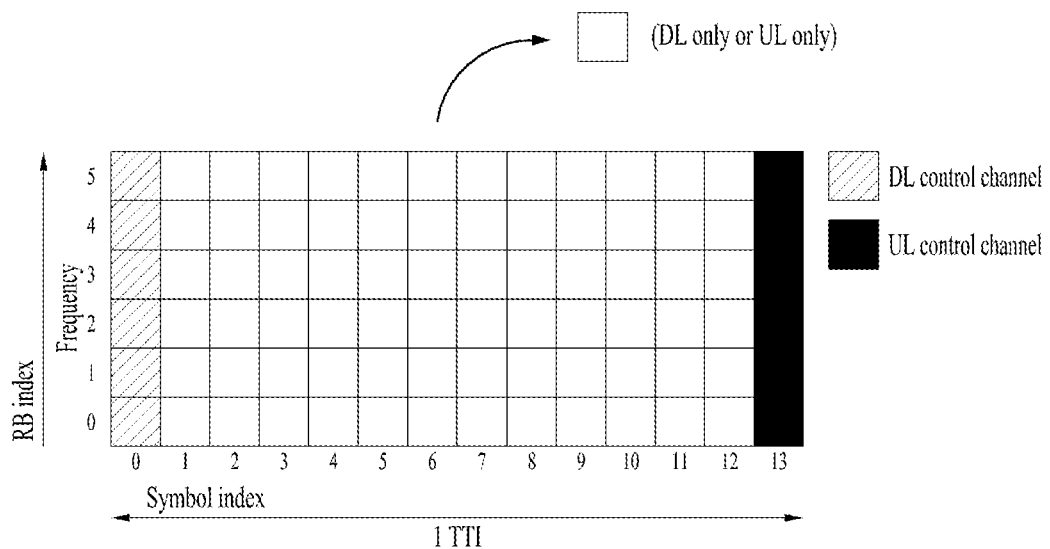
FIG. 6 is a diagram illustrating a self-contained subframe structure applicable to the present disclosure.

FIG. 6 is a diagram illustrating a self-contained subframe structure applicable to the present disclosure.

In the NR system to which the present disclosure is applicable, a self-contained subframe structure as shown in FIG. 6 is proposed in order to minimize data transmission latency in the TDD system.

In FIG. 6, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present disclosure may include not only the case of including both the DL control region and the UL control region but also the case of including either the DL control region or the UL control region alone, as shown in FIG. 6.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

2.2. OFDM Numerology

The NR system uses the OFDM transmission scheme or a similar transmission scheme. Here, the NR system may typically have the OFDM numerology as shown in Table 2.

TABLE 2

| Parameter | Value |
| --- | --- |
| Subcarrier-spacing (Δf) | 75 kHz |
| OFDM symbol length | 13.33 μs |
| Cyclic Prefix (CP) length | 1.04 μs/0.94 μs |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme and may use an OFDM numerology selected from among multiple OFDM numerologies as shown in Table 3. Specifically, as disclosed in Table 3, the NR system may take the 15 kHz subcarrier-spacing used in the LTE system as a base and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the NR system according to the present disclosure, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the NR system according to the present disclosure, and the values thereof may depend on the implementation method.

TABLE 3

| Parameter | Value | Value | Value | Value |
| --- | --- | --- | --- | --- |
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix(CP) length | 5.20 μs/4.69 μs | 2.60 μs/2.34 μs | 1.30 μs/1.17 μs | 0.65 μs/0.59 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
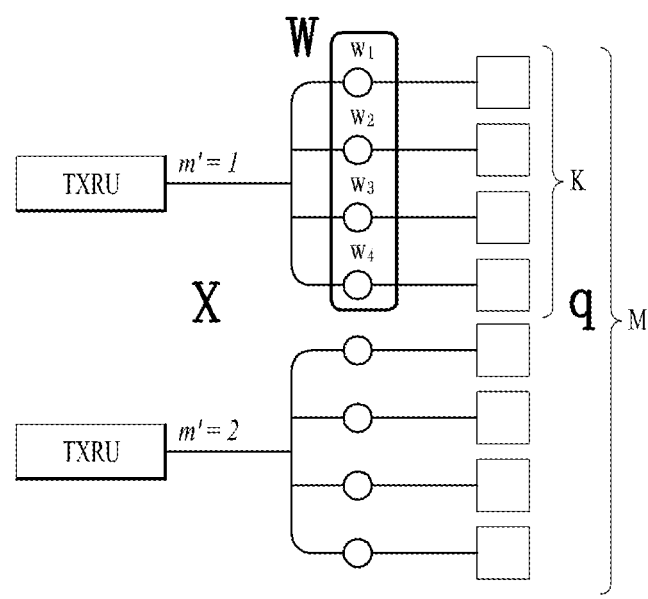
FIGS. 7 and 8 are diagrams illustrating representative methods for connecting TXRUs to antenna elements.
Figure 8:
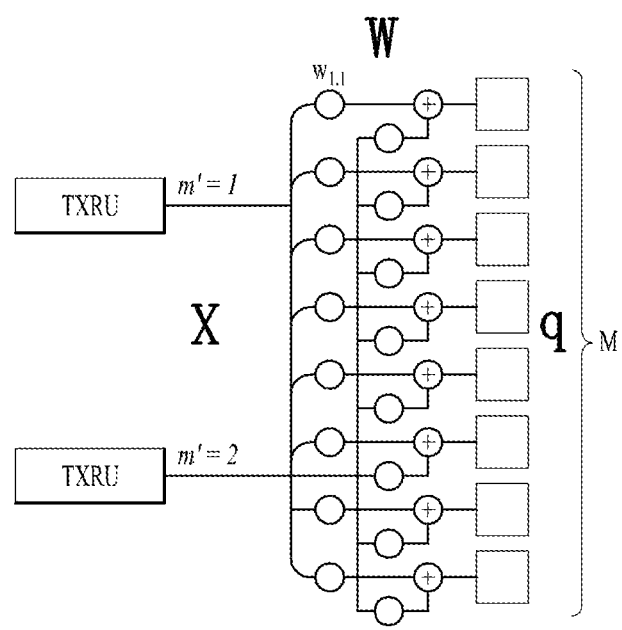

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to subarrays. In FIG. 7, one antenna element is connected to one TXRU.

Meanwhile, FIG. 8 shows a method for connecting all TXRUs to all antenna elements. In FIG. 8, all antenna elements are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

3. Proposed Embodiments

Hereinafter, an aperiodic CSI resource configuration method for analog beams managed by a BS when the BS uses analog beamforming randomly changeable over time and a CSI reporting method will be described based on the above-discussed technical features.

For the above-described NR system, the network slicing method where a plurality of logical networks are implemented on a single physical network has been considered. The logical network should be able to support various services with different purposes (for example, enhanced Mobile Broadband (eMBB), massive Machine Type Communication (mMTC), Ultra-Reliable Low Latency Communication (URLLC), etc.). In addition, a flexible structure capable of applying an Orthogonal Frequency Division Multiplexing (OFDM) scheme with numerology suitable for a service to be provided has also been considered for radio communication (or physical layers) in the NR system. In other words, an OFDM scheme (or multiple access scheme) for supporting different numerology in each time and frequency resource region has been considered in the NR system.

Recently, data traffic has rapidly increased due to the advent of smart devices, and thus, it has been required that the NR system should be able to support much higher communication capacity (e.g., data throughput). In this case, a method of performing data transmission using multiple transmission (or reception) antennas may be considered to improve communication capacity. If digital beamforming is applied to multiple antennas, a Radio Frequency (RF) chain (i.e., a chain composed of RF devices such as a power amplifier, a down converter, etc.) and a D/A (or A/D) converter (i.e., a digital-to-analog converter or an analog-to-digital converter) need to be installed in each of the multiple antennas. However, this structure is not practical because of high hardware complexity and high power consumption.

Therefore, the present disclosure proposes to use a hybrid beamforming method where digital beamforming and analog beamforming are used together when multiple antennas are used in the NR system to which the present disclosure is applicable. Herein, the analog beamforming (or RF beamforming) means that precoding (or combining) is performed at an RF end.

Meanwhile, the hybrid beamforming means that precoding (or combining) is performed at baseband and RF ends, respectively. The hybrid beamforming is advantageous in that it can guarantee performance similar to the digital beamforming while reducing the number of RF chains and the number of D/A (or A/D) converters. For convenience of description, the hybrid beamforming structure can be represented as N Transceiver units (TXRUs) and M physical antennas in the following description. In this case, digital beamforming for L data layers to be transmitted at a transmitting end can be represented as an N*L matrix. Thereafter, N converted digital signals are converted into analog signals after passing through the TXRUs, and then analog beamforming expressed as an M*N matrix may be applied thereto.

Figure 9:
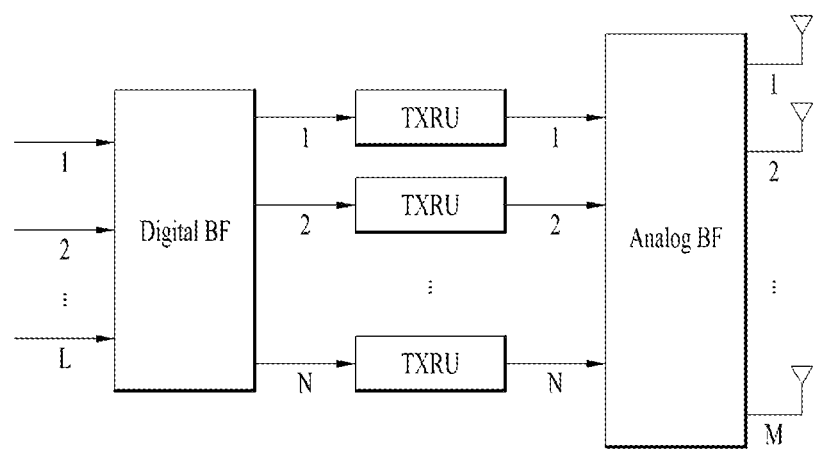
FIG. 9 is a diagram illustrating a hybrid beamforming structure in terms of TXRUs and physical antennas.

FIG. 9 illustrates a hybrid beamforming structure in terms of TXRUs and physical antennas. In FIG. 9, it is assumed that the number of digital beams is L and the number of analog beams is N.

Additionally, it is considered in the NR system to which the present disclosure is applicable that a BS is designed to change analog beamforming on a symbol basis in order to provide more efficient beamforming to a UE located in a specific area. Further, when one antenna panel is defined by N TXRUs and M RF antennas as shown in FIG. 9, the introduction of a plurality of antenna panels to which independent hybrid beamforming is applicable is also considered.

When a BS uses a plurality of analog beams as described above, each UE may prefer a different analog beam for signal reception. Thus, the NR system to which the present disclosure is applicable considers supporting an operation in which a BS changes a plurality of analog beams on a symbol basis in a specific subframe at least with respect to Synchronization Signals (SSs), system information, paging, etc. (this operation is called beam sweeping). By doing so, the BS can provide all UEs with reception opportunities.

Figure 10:
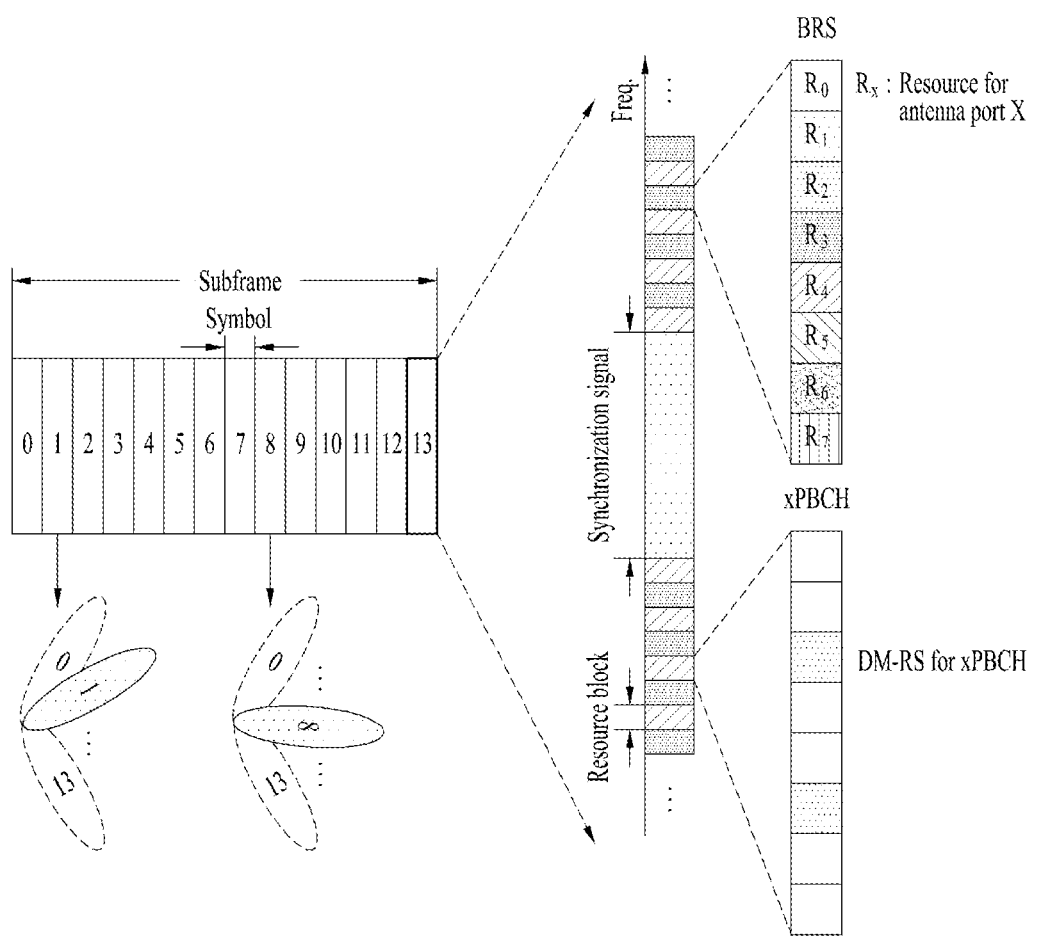
FIG. 10 is a diagram schematically illustrating a beam sweeping operation for an Synchronization Signal (SS) and system information in a downlink (DL) transmission procedure.

FIG. 10 schematically illustrates a beam sweeping operation for an SS and system information during DL transmission. In FIG. 10, a physical resource (or channel) for broadcasting system information of the NR system to which the present disclosure is applicable is referred to as a physical broadcast channel (xPBCH).

In this case, analog beams belonging to different antenna panels can be simultaneously transmitted in one symbol.

In addition, the NR system to which the present disclosure is applicable considers the introduction of a Beam Reference Signal (BRS) corresponding to a Reference Signal (RS) that is transmitted by applying a single analog beam (corresponding to a specific antenna panel) as shown in FIG. 10 in order to measure a channel per analog beam. BRSs can be defined for a plurality of antenna ports, and each BRS antenna port may correspond to a single analog beam. In contrast to the BRS, all analog beams in an analog beam group may be applied to an SS or xPBCH to allow a random UE to correctly receive the SS or xPBCH.

Meanwhile, in the NR system to which the present disclosure is applicable, when a BS intends to transmit a DL signal to a UE, the BS may provide data to the UE using a specific analog bema (hereinafter referred to as a serving beam). If necessary, the BS may transmit information on the serving beam selected by the BS to the UE. If the UE is able to use an analog beam for reception, the UE may attempt to receive the DL signal transmitted from the BS by applying RX (receive) analog beamforming suitable for the serving beam.

If an analog beamforming technique is introduced to the NR system to which the present disclosure is applicable, a UE should be able to measure and report Channel State Information (CSI) for a serving beam through which data is provided. In addition, if the BS uses multiple analog beams, different channels may be formed between the BS and UE because each analog beam has a different reflector (e.g., scatter) and a channel is formed by a reflector. Therefore, it is desirable that the UE performs CSI measurement and reporting per analog beam.

In this case, the UE should at least receive a Channel State Information-Reference Signal (CSI-RS) and Channel State Information-Interference Measurement (CSI-IM) for measuring and reporting CSI for an analog beam for data reception (i.e., a serving beam). As in the LTE system, the CSI-RS can be defined as an RS resource for estimating a channel for CSI calculation, and the CSI-IM can be defined as a resource for measuring interference for the CSI calculation. In the present specification, a resource set including the CSI-RS and CSI-IM is referred to as a CSI resource, and a configuration for CSI-RS and CSI-IM resources is referred to as a CSI resource configuration, for convenience of description.

For example, a BS may configure for a UE a CSI resource configuration only for a single serving beam. Meanwhile, when the UE moves, the best analog beam may vary in terms of reception, and in this case, the BS should continue to change the serving beam to match it with the best analog beam. Thus, if the BS configures the CSI resource configuration only for the single serving beam as in the above example, the BS should update the CSI resource configuration whenever reconfiguring the serving beam. If the CSI resource configuration is configured through a higher layer signal with a relatively large time delay (e.g., RRC signaling), it may cause performance degradation. That is, the BS should reconfigure the CSI resource configuration whenever configuring the serving beam, and in this case, a significant time delay may occur due to the reconfiguration of the CSI resource configuration.

Therefore, considering such frequent changes of the serving beam, it may be desirable that the BS configures CSI resource configurations for multiple analog beams for the UE. In the NR system to which the present disclosure is applicable, an aperiodic CSI resource indication may be considered to aperiodically configure CSI-RS and CSI-IM resources through Dynamic Control Information (DCI).

However, it may not be desirable to configure a CSI resource configuration per analog beam with respect to all analog beams because when aperiodic CSI resources are indicated via DCI, it may cause significant signaling overhead. Therefore, the present disclosure proposes a method in which when a BS uses multiple analog beams, the BS configures a common CSI resource configuration for at least one analog beam by considering beam sweeping characteristics of the analog beams.

In the following description, for convenience of description, a point where DL/UL signals are transmitted/received to/from a UE is referred to as a Transmission and Reception Point (TRP). The TRP may correspond to a specific physical cell, a plurality of physical cell groups, a specific analog beam, or a specific analog beam group. In addition, an antenna port may mean a virtual antenna element where the same channel characteristics (e.g., delay profile, Doppler spread, etc.) can be assumed (at least in the same resource block). Moreover, a Synchronization Signal (SS) may mean a reference signal for a UE to achieve time synchronization with a specific TRP in order to perform transmission and reception to and from the specific TRP, and a subframe (SF) may mean a repeated transmission unit with a predetermined time length. The absolute time length of the SF may vary depending on which numerology is applied.

Further, when antenna ports of two different RSs are quasi-collocated (QCLed), it may mean that delay spread, Doppler spread, Doppler shift, average gain, average delay, arrival/departure angles, etc. of a channel that can be derived from one antenna port can be applied to the other antenna port.

3.1. (Aperiodic) CSI Resource Indication Method 3.1.1. First Aperiodic CSI Resource Indication Method A BS can configure M (independent) CSI resource configurations (where M≥1) for a UE and then inform the UE of N CSI resource configurations (where 1≤N≤M) corresponding to aperiodic CSI resource indication targets among the M CSI resource configurations (through L1 (PHY) signaling or L2 (MAC) signaling).

In this case, the BS may inform the UE of the multiple CSI resource configurations through L3 signaling (e.g., RRC signaling).

More specifically, when a BS uses analog beamforming in the NR system to which the present disclosure is applicable, the BS may configure one analog beam direction per antenna panel at a certain time. Thus, the maximum number of analog beam directions that the BS can transmit at a certain time may be equivalent to the number of antenna panels where phase shifters can be independently installed.

For example, in the NR system to which the present disclosure is applicable, an antenna port for a Beam Reference Signal (BRS) (or RRM-RS) is configured to have one analog beam direction corresponding to an antenna panel, and thus the number of analog beams that a BS can transmit at the same time may be limited to the maximum number of BRS (or RRM-RM) antenna ports.

In this case, a CSI resource configuration, which is configuration information on time and frequency resources for a CSI-RS and CSI-IM, needs to be distinguished only for analog beams that a BS can simultaneously transmit at a certain time. In other words, in the case of analog beams that have the same BRS antenna port and are formed by the beam sweeping operation, even if CSI resources in the same region are used, the CSI resources may not be collided with each other due to Time Division Multiplexing (TDM) features. Thus, the analog beams formed by the beam sweeping operation may share the same CSI resource configuration.

However, sharing of the CSI resource configuration may only mean that the same CSI resource region is used. In other words, even though the CSI resource configuration is shared, CSI calculation should be independently performed per analog beam.

In the same vein, a method of including information on an antenna port (or an analog beam index) of a BRS (or an antenna port of an RRM-RS) having Quasi Co-Location (QCL) relationship with a CSI-RS in a CSI resource configuration may be considered in the NR system to which the present disclosure is applicable.

Figure 11:
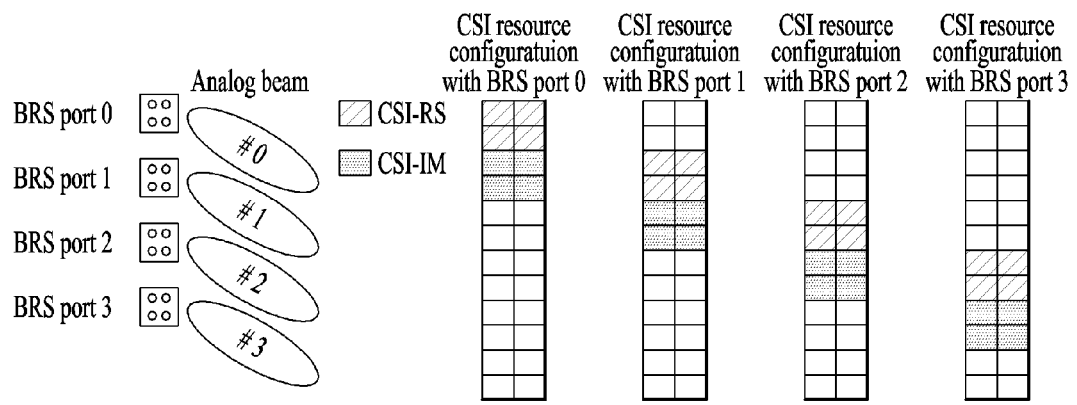
FIG. 11 is a diagram illustrating that when a BS has four antenna panels and four BRS antenna ports, each of which corresponding to each antenna panel, the BS configures four different CSI resource configurations for the BRS antenna ports.

FIG. 11 illustrates that when a BS has four antenna panels and four BRS antenna ports, each of which corresponding to each antenna panel, the BS configures four different CSI resource configurations for the BRS antenna ports.

When a CSI resource configuration includes antenna port information of a BRS (or RRM-RS), a BS may configure multiple CSI resource configurations corresponding to the maximum number of BRS antenna ports (or the number of all antenna panels to which independent analog beams are applied) for a UE through a higher layer signal such as RRC signaling.

However, from the perspective of the UE, the number of potential analog beams, i.e., analog beams that can be used as a serving beam at a specific time may be less than the number of BRS antenna ports. In this vein, it may be desirable that when the BS performs aperiodic CSI resource indication to the UE, the BS configures only CSI resource configurations corresponding to meaningful analog beams in terms of UE reception (e.g., analog beams with high Signal Interference Noise Ratios (SINRs)) as aperiodic CSI resource indication targets.

Therefore, the present disclosure proposes a method in which when a BS configures a serving beam for a UE, the BS selects, as aperiodic CSI resource indication targets, some CSI resource configurations related to the serving beam (or corresponding to analog beams that are expected to be received by the UE) from among CSI resource configurations preconfigured through a higher layer signal such as RRC signaling and then informs the selected CSI resource configurations. For example, after configuring eight CSI resource configurations through RRC signaling, a BS may select and inform four CSI resource configurations corresponding to aperiodic CSI resource indication targets when configuring a serving beam. In this case, the BS may perform the aperiodic CSI resource indication only for the four CSI resource configurations until configuring a next serving beam.

Here, information on a BRS (or RRM-RS) antenna port associated with a CSI resource configuration may be used as a seed value for generating a CSI-RS sequence.

3.1.2. Second Aperiodic CSI Resource Indication Method

A BS can configure multiple serving beams together with antenna port information of a BRS (or RRM-RS) corresponding to each serving beam for a UE and inform the UE of a CSI resource configuration having Quasi Co-Location (QCL) relationship with a CSI-RS per serving beam index.

In this case, a serving beam configuration or QCL information between a CSI-RS and a serving beam index may be transmitted to the UE through L1 (PHY) signaling, L2 (MAC) signaling, or L3 (RRC) signaling.

In addition, the multiple serving beams may mean a set of multiple analog beams where it is expected that the UE will receive data therethrough.

Moreover, QCL relationship between a serving beam index and a CSI-RS may mean that an analog beam corresponding to the corresponding serving beam index is applied to the CSI-RS. In particular, the UE may assume that a BRS (or RRM-RS) antenna port of a serving beam with a serving beam index has QCL relationship with a CSI-RS QCLed with the serving beam index.

More specifically, in the NR system to which the present disclosure is applicable, a UE may be allocated a serving beam through L1 or L2 signaling with relatively short time delay. In other words, when a BS intends to configure analog beam information for each CSI resource configuration, the BS may semi-statically configure the corresponding information through a higher layer signal such as RRC signaling. Thereafter, when configuring a serving beam, the BS may configure an analog beam index for each CSI resource configuration through association with the corresponding serving beam.

For example, a BS may configure M CSI resource configurations through a higher layer signal such as RRC signaling. Thereafter, when configuring for a UE multiple serving beam indices with good reception sensitivities through a MAC CE (or DCI), the BS may indicate a CSI resource configuration having QCL relationship with a CSI-RS per serving beam index. This operation has an advantage in that when the BS changes the serving beam of the UE, the analog beam information per CSI resource configuration is updated.

Figure 12:
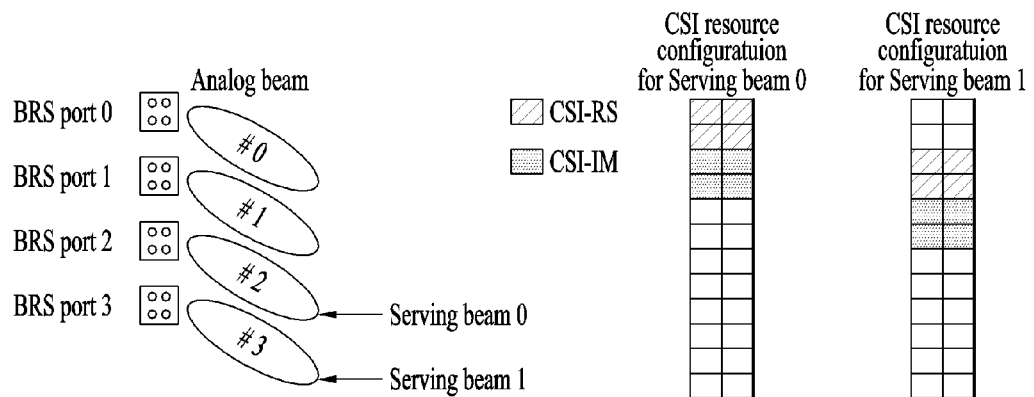
FIG. 12 is a diagram illustrating that when a BS has four antenna panels and four BRS antenna ports, each of which corresponding to each antenna panel, the BS configures a CSI resource configuration for each serving beam.

FIG. 12 illustrates that when a BS has four antenna panels and four BRS antenna ports, each of which corresponding to each antenna panel, the BS configures a CSI resource configuration for each serving beam.

As show in FIG. 12, the BS may configure two CSI resource configurations (configurations #0 and #1) first and then configure analog beam indices #2 and #3 (or BRS antenna ports 2 and 3) as multiple serving beams. In this case, analog beam information applied to CSI resource configurations #0 and #1 correspond to serving beam indices #0 and #1 (i.e., analog beam indices #2 and #3), respectively.

In particular, according to the method proposed in this section, QCL relationship is defined using a serving beam index as an intermediate variable instead of directly matching antenna port information of a BRS (or RRM-RS) to be QCLed with a CSI resource configuration. Thus, it has an advantage in that when a BS changes a serving beam, the antenna port information of the BRS (or RRM-RS) QCLed with the CSI resource configuration can be flexibly changed. For example, a serving beam may be configured through DCI or a MAC CE, and QCL information between a serving beam index and a CSI-RS may be configured through a higher layer signal (e.g., RRC signaling).

Here, antenna port information of a BRS (or RRM-RS) associated with a CSI resource configuration may be used as a seed value for generating a CSI-RS sequence.

3.1.3. Third Aperiodic CSI Resource Indication Method

When a BS performs aperiodic CSI resource indication for L (independent) CSI resource configurations (where L≥1) for a UE, the BS can inform the UE of the following information through DCI.

(1) A CSI resource configuration applied to aperiodic CSI resources

One of the L CSI resource configurations is selected and indicated.

The CSI resource configuration includes antenna port information of a BRS (or RRM-RS) having QCL relationship with a CSI-RS.

(2) A sweeping index (or a set of multiple sweeping indices) applied to aperiodic CSI resources (or corresponding to analog beams)

Here, the sweeping index means an index for distinguishing between different analog beams which are generated when the beam sweeping operation is applied to the same BRS (or RRM-RS) antenna port. In this specification, the above definition of the sweeping index is used.

In this case, the BS may configure a sweeping index set corresponding to aperiodic CSI resource indication targets for the UE (through L1 (PHY) signaling or L2 (MAC) signaling). Thereafter, when performing aperiodic CSI indication, the BS may indicate a sweeping index (or sweeping indices) in the set.

Figures 13, 14:
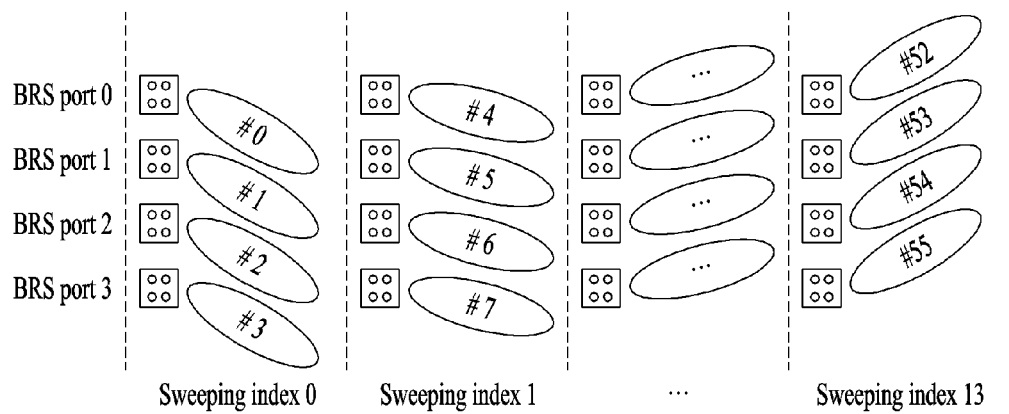
FIG. 13 is a diagram illustrating a configuration in which when a BS has four antenna panels and four BRS antenna ports, each of which corresponding to each antenna panel, in the NR system to which the present disclosure is applicable, the BS uses fourteen analog beams per antenna panel (a total of fifty-six analog beams) based on a beam sweeping operation.
FIG. 14 is a diagram illustrating a ZP CSI-RS configuration applicable when resources are defined for 24 antenna ports for a CSI RS.

FIG. 13 illustrates a configuration in which when a BS has four antenna panels and four BRS antenna ports, each of which corresponding to each antenna panel, in the NR system to which the present disclosure is applicable, the BS uses fourteen analog beams per antenna panel (a total of fifty-six analog beams) based on the beam sweeping operation.

Assuming that the number of BRS antenna port indices is P (e.g., p=0, 1, . . . , P-1), M different analog beams are generated according to the beam sweeping operation applied to the same BRS port, M sweeping indices are predefined to distinguish between the M analog beams (e.g., m=0, 1, . . . , M-1), each analog beam index can be assumed to be BRS port index+BRS port number*sweeping index (e.g., p+P*m, p=0, 1, . . . , P-1, and m=0, 1, . . . , M-1). FIG. 13 shows an analog beam indexing configuration in the case of P=4 and M=14.

That is, a specific analog beam index can be represented by a combination of a BRS (or RRM-RS) antenna port index for an analog beam and a sweeping index. Thus, when antenna port information of a BRS (RRM-RS) corresponding to a CSI resource configuration is given as shown in FIG. 11, a UE should know not only the corresponding CSI resource configuration but also a sweeping index applied to specific CSI resources (e.g., CSI-RS, CSI-IM, etc.) in order to obtain an analog beam index applied to the corresponding CSI resources.

Therefore, in this section, proposed is a method in which when a BS transmits transmission information on aperiodic CSI resources, the BS informs a CSI resource configuration applied to the aperiodic CSI resources (including antenna port information of a BRS (or RRM-RS)) and a sweeping index. In this case, a BS may instruct to measure and report multiple pieces of CSI by indicating a plurality of sweeping indices to reduce DCI signaling overhead.

Referring to FIG. 13, the BS may configure four CSI resource configurations for a UE and then configure information on a BRS port QCLed with each CSI resource configuration through RRC signaling. In this case, a beam group with the same BRS port (e.g., beam indices k, k+4, k+8, . . . , and, k+52) may share a single (or same) CSI resource configuration.

Subsequently, when configuring a serving beam for the UE, the BS may configure a sweeping index set. For example, in FIG. 13, when configuring analog beam #4 as the serving beam, the BS may configure the sweeping index set={0, 1, 2, 3}. In addition, the BS may indicate one of the four CSI resource configurations for CSI measurement using 2 bits of an aperiodic CSI resource indication and indicate a specific index in the sweeping index set (e.g., one of {0, 1, 2, 3}) using the other 2 bits. In this case, the BS may inform the UE whether CSI resources for analog beams #0, #1, . . . , and #15 are transmitted or not through the aperiodic CSI resource indication.

3.1.4. Fourth Aperiodic CSI Resource Indication Method

When a BS configures a sweeping index set corresponding to aperiodic CSI resource indication targets for a UE, the BS can configure the sweeping index set per symbol group index (or SF index).

In this case, the BS may configure the sweeping index set for the UE (through L1 (PHY) signaling or L2 (MAC) signaling) or include information on the sweeping index set in a CSI resource configuration (through L3 (RRC) signaling) to inform the sweeping index set.

More specifically, in addition to the configuration described in section 3.1.3, a BS may configure a sweeping index set corresponding to aperiodic CSI resource indication targets per different CSI resource in the time domain. For example, assuming that CSI-RS resources in one SF are two OFDM symbols, the BS may configure a set of sweeping indices corresponding to aperiodic CSI resource indication targets (i.e., a sweeping index set that can be indicated through an aperiodic CSI resource indication) based on a symbol location at which a CSI-RS is transmitted.

For example, as shown in FIG. 13, a BS may configure a sweeping index set for the first symbol in a CSI-RS resource region as {0, 1, 2, 3} and a sweeping index set for the second symbol as {4, 5, 6, 7}. Thereafter, the BS may indicate one of four CSI resource configurations for CSI measurement using 2 bits of an aperiodic CSI resource indication. In addition, using the remaining 2 bits, the BS may indicate a specific index in the sweeping index set per symbol where a CSI-RS is transmitted (for example, the BS may indicate one of {0, 1, 2, 3} if a CSI-RS transmission symbol is the first symbol (in the CSI-RS resource region) and indicate one of {4, 5, 6, 7} if the CSI-RS transmission symbol is the second symbol (in the CSI-RS resource region)). In this case, the BS may inform a UE whether CSI resources for analog beams #0, #1, . . . , #30, and #31 shown in FIG. 13 are transmitted or not through the aperiodic CSI resource indication. Here, the number of analog beams that can be represented by a single CSI resource configuration may increase in proportion to the number of time-domain CSI resources in a SF (where a different sweeping index is configured).

3.1.5. Fifth Aperiodic CSI Resource Indication Method

A BS can define for a UE resources for each of M antenna ports as a Zero Power (ZP) CSI-RS configuration for a UE and then configure one of the following L states for the individual resources corresponding to each antenna port through a higher layer signal (e.g., L3 signaling).

(1) Region 1
(2) Region 2
(3) . . .
(4) Region L

Thereafter, the BS can inform the UE whether data transmission is performed in each of the L resource regions (where L≤M) through DCI.

In the LTE system, a resource region, which is called a ZP CSI-RS region, is defined to mitigate the effect of interference on a CSI-RS transmitted by a neighbor cell, and a method where no data transmission is performed in the ZP CSI-RS region (e.g., PDSCH RE muting) is defined. Similarly, in the NR system to which the present disclosure is applicable, a ZP CSI-RS can be considered to reduce interference to a CSI-RS transmitted over a neighbor analog beam.

When aperiodic CSI-RS transmission is introduced to the NR system, a ZP CSI-RS resource in a specific SF should be able to be dynamically indicated. Since the object of the ZP CSI-RS resource is to define a region where data transmission is not performed, it may not be indicated for overlapping resources and thus can be indicated as a bitmap for different resource regions. If regarding a CSI-RS, resources can be defined per antenna port for a maximum of M antenna ports, the ZP CSI-RS may indicate whether data transmission is performed on resources for each antenna port using an M-bit bitmap.

However, since a CSI-RS is generally configured on a multiple-antenna-port basis, the present disclosure proposes a method in which a BS sets resource regions for M antenna ports to L resource regions (where L<M) and then indicate only whether a PDSCH is transmitted in each of the L resource regions through DCI.

FIG. 14 illustrates a ZP CSI-RS configuration applicable when resources are defined for 24 antenna ports for a CSI RS.

When the CSI-RS resources are defined for the 24 antenna ports as shown in the left figure of FIG. 14, 24 bits are required to indicate whether data is transmitted on the resource per antenna port. However, when CSI-RS transmission resources are divided into 4 regions as shown in the right figure of FIG. 14, whether data transmission is performed can be indicated using only 2-bit information as described in this section.

3.2. CSI Reporting Method 3.2.1. First CSI Reporting Method

When a BS transmits the same CSI resource via multiple analog beams, a UE can report information on a preferred CSI resource among the multiple (beamformed) CSI resources transmitted from the BS according to one of the following methods.

(1) The UE may report a CSI resource index (or CSI resource configuration index) and a sweeping index.

(2) The UE may report an analog beam index for the preferred CSI-RS resource.

In this case, the CSI resource index (or CSI resource configuration index) may mean an index for distinguishing between CSI resources having different resource regions.

In an embodiment of the present disclosure, if a UE is able to receive signals from multiple analog beams, a BS may transmit a plurality of CSI resources, where the individual analog beams are applied, and receive feedback of a CSI resource preferred by the UE in order to compare channel states for the individual analog beams during a short-term period. However, assuming that a BS shares and uses the same CSI resource for multiple analog beams generated by the beam sweeping operation as described in sections 3.1.3 and 3.1.4 and a UE reports only preferred CSI resource index information to the BS, the BS cannot determine which analog beam among the multiple analog beams sharing the corresponding CSI resource region the UE prefers.

Therefore, the present disclosure proposes a method in which when a UE reports preferred CSI resource information to a BS, the UE informs CSI resource information and analog beam information by applying a sweeping index together with a corresponding CSI resource index or informs analog beam index information.

3.2.2. Second CSI Reporting Method

When a UE performs CSI reporting, the UE can report not only CSI feedback information but also UE's reception state information on analog beams managed by a BS to the BS as follows.

(1) Reporting of best M analog beam indices (where M≥1) in terms of UE reception (2) BSI reporting request Here, Reference Signal Received Power (RSRP) measured using a BRS (or RRM-RS) to which a corresponding analog beam is applied may be used as a criterion for selecting the best M analog beams in terms of reception.

In addition, the BS may inform the UE whether the UE should report both the CSI and the UE's reception state information on the analog beams or only the CSI when performing the CSI reporting through a higher layer signal (e.g., L3 signaling (RRC signaling)).

More specifically, in the NR system to which the present disclosure is applicable, upon receiving reception information on analog beams from a UE, a BS may configure the best analog beam among the analog beams as a serving beam for providing data services. However, the serving beam configured by the UE may not be equivalent to the best analog beam in terms of UE reception due to UE's mobility or Discontinuous Reception (DRX) operation.

In this case, in the NR system to which the present disclosure is applicable, the BS may request the UE to perform a Beam State Information (BSI) reporting operation, which is part of UE's reception state information on analog beams for the purpose of reconfiguring the serving beam. For example, if the beast analog beam is changed in terms of reception, the UE may transmit a BSI reporting request signal, which is called a BSI-Scheduling Request (BSI-SR). Upon receiving the BSI-SR, the BS may allocate a UL resource for BSI reporting to the corresponding UE and then receive a BSI report. However, assuming that the BS instructs to perform the CSI reporting, which is more frequently performed, for the purpose of UE scheduling, it may be desirable that the UE transmits the CSI and BSI report or the BSI reporting request (i.e., BSI-RS) on a UL resource reserved for the CSI reporting in terms of efficient use of resources.

Therefore, the present disclosure proposes a method in which a UE reports information on best M analog beams (where M≥1) in terms of UE reception or BSI reporting request information together with CSI feedback information. In this case, UE's reception state information for analog beams may be transmitted together with CSI with a relatively long periodicity, for example, an RI or a CSI-RS Resource Index (CRI).

3.2.3. Third CSI Reporting Method

When a UE needs to perform measurement and CSI calculation/reporting for (aperiodic) CSI resources which exceed capability related to the (aperiodic) CSI calculation/processing, the UE or a BS can give priority for the CSI calculation/reporting as follows.

(1) Priority is given to (aperiodic) CSI resources corresponding to a serving beam. If there are multiple serving beams, the multiple serving beams are prioritized in ascending (or descending) order of serving beam indices.

(2) Priority is given to (aperiodic) CSI resources corresponding to best M analog beams in terms of UE reception.

In this case, (all or) the remaining (aperiodic) CSI resources may be prioritized in ascending (or descending) order of analog beam indices (or sweeping indices). Alternatively, priority may be given to an analog beam with a high reception sensitivity in terms of the UE reception.

In addition, RSRP measured using a BRS (or RRM-RS) to which the corresponding analog beam is applied may be used as a reception sensitivity for an analog beam (or a criterion for selecting the best M analog beams in terms of the reception).

Specifically, from the perspective of a UE, DCI including an aperiodic CSI resource indication and associated CSI reporting may be received multiple times during a short time period. In this case, if the UE should simultaneously calculate and report CSI for aperiodic CSI resources exceeding its own aperiodic CSI calculation/processing capability, a priority rule about which CSI resources the UE should use first for CSI update needs to be determined.

In this case, the UE may preferentially update CSI for aperiodic CSI resources with a low (or high) analog beam index or a low (or high) sweeping index or CSI for aperiodic CSI resources for the best M analog beams selected with respect to BRSRP corresponding to RSRP measured by the UE using BRSs.

Additionally, when a UE needs to perform measurement and CSI calculation/reporting for (aperiodic) CSI resources which exceed capability related to the (aperiodic) CSI calculation/processing (or when the UE does not have enough time for the CSI calculation/reporting), some CSI reporting types of the UE may be limited according to priority between analog beams. For example, in the case of CSI corresponding to a serving beam, wideband/subband CSI reporting is possible, whereas in the case of CSI for other analog beams, only wideband CSI reporting may be allowed. Alternatively, in the case of the CSI for other analog beams except the serving beam, only explicit feedback (e.g., direct feedback of a channel coefficient) may be allowed.

As described above, the present disclosure proposes various (aperiodic) CSI reporting methods, and a UE can perform CSI reporting by using one of the proposed methods or combining at least one method.

To this end, the UE receives information indicating at least one CSI resource for the CSI reporting from a BS that transmits signals using multiple analog beams. In this case, the information indicating the at least one CSI resource may include at least one piece of CSI resource configuration information and information on one or more analog beams, each of which corresponds to each piece of CSI resource configuration information.

Thereafter, the UE calculates CSI feedback for the at least one CSI resource and transmits the calculated CSI feedback to the BS.

For example, the UE may further receive information on a plurality of CSI resource configurations from the BS through RRC signaling. In this case, the information on the one or more analog beams may include antenna port information corresponding to at least one CSI resource configuration among the plurality of CSI resource configurations, and the information indicating the at least one CSI resource for the CSI reporting may be transmitted through physical layer or MAC layer signaling.

As another example, the UE may further receive information on a QCLed CSI resource configuration per serving beam index from the BS through RRC signaling. In this case, the information on the one or more analog beams may include information indicating an index of at least one serving beam used by the BS for signal transmission, and the information indicating the at least one CSI resource for the CSI reporting may be transmitted through physical layer or MAC layer signaling.

As still another example, the at least one piece of CSI resource configuration information may include information on an antenna port having Quasi Co-Location (QCL) relationship with each CSI resource configuration, and the information on the one or more analog beams may include information indicating a sweeping index including the one or more analog beams in a sweeping index set applied to the at least one CSI resource.

In this case, the UE may further receive information on the sweeping index set applied to the at least one CSI resource from the BS. The information on the sweeping index set may include information on a corresponding sweeping index set per at least one symbol.

As yet another example, the UE may further receive information on a plurality of ZP CSI-RS configurations from the BS. In this case, the information indicating the at least one CSI resource may further include information indicating at least one ZP CSI-RS configuration among the plurality of ZP CSI-RS configurations, and the CSI feedback may be calculated by additionally considering the at least one ZP CSI-RS configuration.

As a further example, the CSI feedback may include information on a CSI resource preferred by the UE among the at least one CSI resource. Here, the information on the CSI resource preferred by the UE may include a CSI resource configuration index corresponding to the CSI resource preferred by the UE and a sweeping index including an analog beam preferred by the UE among one or more analog beams corresponding to the preferred CSI resource. Alternatively, the information on the CSI resource preferred by the UE may include index information of an analog beam preferred by the UE among one or more analog beams corresponding to the CSI resource preferred by the UE.

As a still further example, when transmitting the CSI feedback, the UE may further transmit, to the BS, information on at least one analog beam with a good reception sensitivity in terms of reception at the UE.

As a yet further example, when transmitting the CSI feedback, the UE may transmit a signal requesting Beam State Information (BSI) reporting to the BS.

Here, the CSI feedback calculation method performed by the UE may include: when the number of the at least one CSI resource indicated by the BS exceeds maximum CSI calculation capability of the UE, selecting at least one CSI resource for calculating the CSI feedback from among the at least one CSI resource indicated by the BS according to a predetermined criterion; and calculating the CSI feedback only for the selected at least one CSI resource.

In the CSI feedback calculation method, the predetermined criterion may include an order of serving beam indices corresponding to the at least one CSI resource or an order of CSI resources corresponding to analog beams with good reception sensitivities in terms of reception at the UE.

In addition, the CSI resource configuration information may include information on CSI-RS and CSI-IM resources.

Since each of the examples of the proposed methods can be considered as one method for implementing the present disclosure, it is apparent that each example can be regarded as a proposed method. In addition, it is possible to implement the proposed methods not only independently but by combining (or merging) some of the proposed methods. Moreover, a rule may be defined such that information on whether the proposed methods are applied (or information on rules related to the proposed methods) should be transmitted from a BS to a UE through a predefined signal (e.g., physical layer signal, higher layer signal, etc.).

4. Device Configuration

Figure 15:
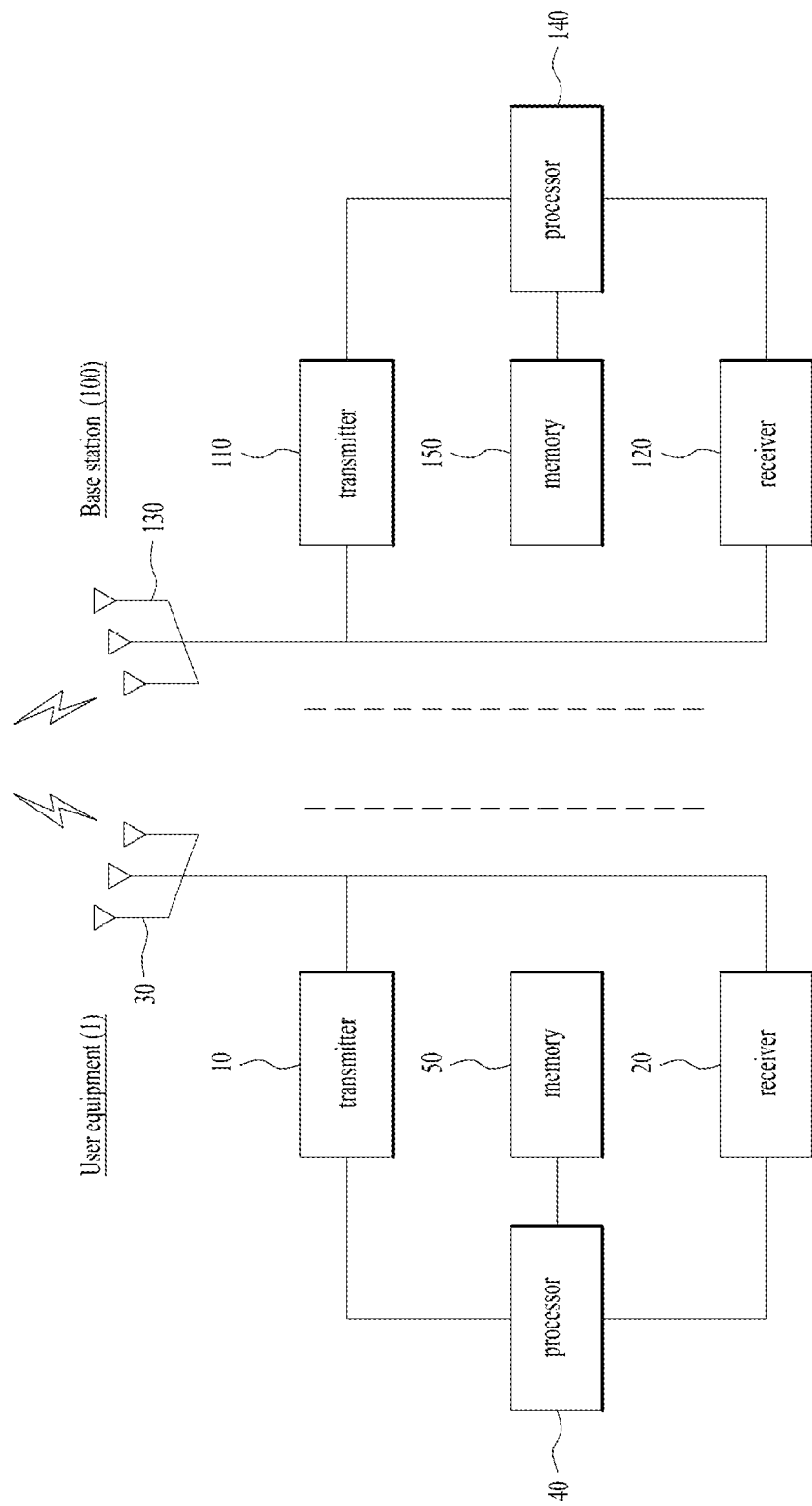
FIG. 15 is a diagram illustrating configurations of a terminal and a base station for implementing the proposed embodiments.

FIG. 15 illustrates configurations of a user equipment and a base station for implementing the proposed embodiments. The user equipment and base station illustrated in FIG. 15 operate to implement the embodiments of the method of transmitting and receiving CSI between a user equipment and a base station.

A User Equipment (UE) 1 may act as a transmission end in uplink and a reception end in downlink. A base station (or e-Node B (eNB)) 100 may act as a reception end in uplink and a transmission end in downlink.

Each of the UE and BS may include a transmitter 10/110 and a receiver 20/120 for controlling transmission and reception of information, data, and/or messages and an antenna 30/130 for transmitting and receiving information, data, and/or messages.

In addition, each of the UE and BS may include a processor 40/140 for implementing the above-described embodiments of the present disclosure and a memory 50/150 for temporarily or permanently storing operations of the processor 40/140.

With the above-described configuration, the UE 1 may report CSI to the BS 100 performing signal transmission using multiple analog beams according to the following method.

Specifically, the UE 1 receives information indicating at least one CSI resource for CSI reporting from the BS 100 through the receiver 20. In this case, the information indicating the at least one CSI resource may include at least one piece of CSI resource configuration information and information on one or more analog beams, each of which corresponds to each piece of CSI resource configuration information.

Thereafter, the UE 1 calculates CSI feedback for the at least one CSI resource through the processor 40 and then transmits the calculated CSI feedback to the BS through the transmitter 10.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 23 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of transmitting channel state information (CSI) by a user equipment (UE) in a wireless communication system, the method comprising:
   receiving, from a base station (BS), configuration information related to at least one CSI report, wherein the configuration information includes first information related to at least one CSI resource, and second information related to whether reception state information is included in the at least one CSI report;
   receiving, from the BS, downlink control information (DCI) requesting at least one CSI report; and
   transmitting, to the BS, at least one CSI report based on the first information and the second information,
   wherein a CSI-reference signal (CSI-RS) resource index (CRI) is included in the at least one CSI report based on the reception state information—included in the CSI report,
   wherein the reception state information includes reference signal reception power (RSRP).

2. The method of claim 1, wherein based on a first number of CSI reports being requested by the DCI, a second number of CSI reports being transmitted, and the first number being greater than the second number, the second number of the CSI reports among the first number of CSI reports is updated based on a maximum CSI calculation capability of the UE.

3. The method of claim 2, wherein priorities are assigned to the first number of CSI reports based on the maximum CSI calculation capability of the UE and a predetermined criterion, and the second number of CSI reports are transmitted based on the priorities.

4. The method of claim 1, wherein the at least one CSI resource comprises at least one of at least one CSI-RS resource, or at least one channel state information-interference measurement (CSI-IM) resource.

5. A user equipment (UE) configured for transmitting channel state information (CSI) in a wireless communication system, the UE comprising:
   a transmitter;
   a receiver; and
   at least one processor operatively coupled to the transmitter and the receiver, wherein the at least one processor is configured to:
   receive, through the receiver, from a base station (BS), configuration information related to at least one CSI report, wherein the configuration information includes first information related to at least one CSI resource, and second information related to whether reception state information is included in the at least one CSI report;
   receive, through the receiver, from the BS, downlink control information (DCI) requesting at least one CSI report; and
   transmit, through the transmitter, to the BS, at least one CSI report based on the first information and the second information,
   wherein a CSI-reference signal (CSI-RS) resource index (CRI) is included in the at least one CSI report based on the reception state information-included in the CSI report,
   wherein the reception state information includes reference signal reception power (RSRP).

6. A method of receiving channel state information (CSI) by a base station (BS) in a wireless communication system, the method comprising:
- transmitting, to a user equipment (UE), configuration information related to at least one CSI report, wherein the configuration information includes first information related to at least one CSI resource, and second information related to whether reception state information is included in the at least one CSI report;
- transmitting, to the UE, downlink control information (DCI) requesting at least one CSI report; and
- receiving, from the UE, at least one CSI report based on the first information and the second information,
- wherein a CSI-reference signal (CSI-RS) resource index (CRI) is included in the at least one CSI report based on the reception state information—included in the CSI report,
- wherein the reception state information includes reference signal reception power (RSRP).

7. A processing apparatus configured to control a user equipment (UE) to transmit channel state information (CSI) in a wireless communication system, the processing apparatus comprising:
- at least one processor; and
- at least one computer memory operably connected to the at least one processor and
- storing instructions that, based on being executed by the at least one processor, perform operations comprising:
  - receiving, from a base station (BS), configuration information related to at least one CSI report, wherein the configuration information includes first information related to at least one CSI resource, and second information related to whether reception state information is included in the at least one CSI report;
  - receiving, from the BS, downlink control information (DCI) requesting at least one CSI report; and
  - transmitting, to the BS, at least one CSI report based on the first information and the second information,
- wherein a CSI-reference signal (CSI-RS) resource index (CRI) is included in the at least one CSI report based on the reception state information included in the CSI report,
- wherein the reception state information includes reference signal reception power (RSRP).

* * * * *

UNITED STATES PATENT AND TRADEMARK OFFICE
CERTIFICATE OF CORRECTION

PATENT NO. : 11,438,045 B2  Page 1 of 1
APPLICATION NO. : 17/141793
DATED : September 6, 2022
INVENTOR(S) : Hanjun Park et al.

It is certified that error appears in the above-identified patent and that said Letters Patent is hereby corrected as shown below:

In the Claims

Column 28, Line 22, Claim 1, amend "information-included in the CSI" to --information being included in the at least one CSI--;

Column 28, Line 64, Claim 5, amend "information-included in the CSI" to --information being included in the at least one CSI--;

Column 29, Line 16, Claim 6, amend "information-included in the CSI" to --information being included in the at least one CSI--;

Column 30, Line 18, Claim 7, amend "information included in the CSI" to --information being included in the at least one CSI--.

Signed and Sealed this
Twenty-fifth Day of April, 2023

Katherine Kelly Vidal
*Director of the United States Patent and Trademark Office*